United States Patent [19]

Bradshaw et al.

[11] 3,903,113

[45] Sept. 2, 1975

[54] PREPARATION OF ETHERIFIED HYDROXYIMINOACETIC ACIDS

[76] Inventors: Janice Bradshaw, 37 Hamilton Rd., Harrow, Middlesex; Godfrey Basil Webb, 41 Barnham Rd., Greenford, Middlesex, both of England

[22] Filed: Nov. 7, 1972

[21] Appl. No.: 304,491

[30] Foreign Application Priority Data
May 8, 1972  United Kingdom............... 21412/72
Oct. 26, 1972  United Kingdom............... 21412/72

[52] U.S. Cl.. 260/332.2 A; 260/293.87; 260/295 R; 260/295.5 R; 260/306.8 A; 260/306.8 D; 260/307 G; 260/307 H; 260/310 A; 260/326 N; 260/326.14 R; 260/326.2; 260/326.35; 260/326.47; 260/330.5; 260/346.2 R; 260/347.3; 260/347.4; 260/349; 260/390; 260/468 H; 260/468 J; 260/465 D; 260/471 A; 260/482 R; 260/514 H; 260/514 J; 260/518 R; 260/534 R

[51] Int. Cl. ................... C07d 63/12; C07c 51/09
[58] Field of Search.......... 260/332.2 A, 330.5, 519, 260/471 A, 518 R

[56] References Cited
OTHER PUBLICATIONS
Ahmad, et al., Can. J. Chem. 1961, 39, 1340.

*Primary Examiner*—Henry R. Jiles
*Assistant Examiner*—C. M. S. Jaisle

[57] ABSTRACT

A process for separating the syn and anti components in an ester derivative of an α-(etherified oximino) carboxylic acid existing as a mixure of the syn and anti isomers comprises partially hydrolysing the mixture under basic conditions and separating the preferentially formed anti acid from the residual syn ester. Subsequently the syn ester may also be hydrolysed under basic conditions to yield the syn acid.

8 Claims, No Drawings

PREPARATION OF ETHERIFIED HYDROXYIMINOACETIC ACIDS

This invention relates to a process for the preparation of etherified hydroxyiminoacetic acid derivatives in substantially pure isomeric form.

The copending applications of Gregson et al. Ser. No. 221,057, filed Jan. 25, 1972 and now abandoned; the continuation-in-part thereof Ser. No. 274,602, filed July 24, 1972; Gregson et al. Ser. No. 221,063, filed Jan. 25, 1972 and now abandoned in favor of a continuation-in-part thereof Ser. No. 374,408, filed June 28, 1973; Cook et al. application Ser. No. 252,665, filed May 12, 1972 and now abandoned in favor of a continuation thereof Ser. No. 398,080, filed Sept. 17, 1973; Cook et al. application Ser. No. 252,666, filed May 12, 1972 and now abandoned in favor of a continuation-in-part thereof Ser. No. 304,524, filed Nov. 7, 1972; and Cook et al. application Ser. No. 252,846, filed May 12, 1972 and now abandoned in favor of a continuation-in-part thereof Ser. No. 304,501, filed Nov. 7, 1972 describe a number of 7β-acylamidocephalosporanic acid and 6β-acylamidopenicillanic acid derivatives in which the acylamido group is an α-(hydroxyimino, acyloxyimino or etherified oximino) acylamido group. Such compounds may exist as a mixture of syn and anti isomers, but are more preferably prepared and used in a substantially pure isomeric form (e.g. containing at least 75% of the syn or anti isomer) on account of the significantly different antibiotic properties which may be exhibited by the syn and anti isomers of a given compound of this type.

The said α-(hydroxyimino, acyloxyimino or etherified oximino) acylamido penicillin and cephalosporin derivatives may be prepared by, for example, condensing a 6-aminopenicillanic acid or 7-aminocephalosporanic acid derivative with an acylating agent, such as an acyl halide, acid anhydride or activated ester, corresponding to or comprising a precursor for the desired α-(hydroxyimino, acyloxyimino or etherified oximino)acyl group, or by condensing an activated penicillin or cephalosporin derivative such as a 6- or 7-isocyanato derivative with an acid corresponding to or comprising a precursor for the desired acyl group.

Since, where an acylating agent is used, this will generally be derived from the corresponding acid, such methods will in general require the preparation of an acid of formula

$$R^u.C{:}NOR^a.COOH \tag{I}$$

where $R^u$ is a hydrogen atom or an organic group and $R^a$ is a hydrogen atom, an acyl group, or an etherifying monovalent organic group linked to the oxygen atom through a carbon atom, such an acid being normally recovered as a mixture of a syn isomer corresponding to the formula

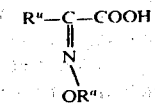

(Ia)

and an anti isomer corresponding to the formula

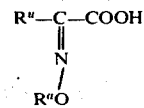

(Ib)

where $R^u$ and $R_a$ have the above-defined meanings. Alternatively such a mixture may be manufactured by equilibrating one of the said isomers. [The above configurations are assigned on the basis of the work of Ahmad and Spenser (Can. J. Chem., 1961, 39, 1340)].

In order to minimise the number of reaction stages involving the penicillin or cephalosporin reagent where a substantially isomerically pure final product is required, it is desirable that the acid of formula I or the derivative thereof used in the preparation be obtained in a substantially pure isomeric form before reaction with the penicillin or cephalosporin reagent. Conventional separation techniques such as crystallisation and preparative layer chromatography may fail to produce adequate separation of the syn and anti isomers of acids of formula I or derivatives thereof or may be inconvenient to use. There is a need for improved and alternative separation techniques.

We have now found that a broad range of acids of formula I wherein $R^a$ is an etherifying group may be separated into their constituent syn and anti isomers by a technique involving selective hydrolysis of an ester derivative of the isomer mixture. Thus we have discovered that the anti ester can be preferentially hydrolysed and may be separated as the free acid ordinarily in the form of a salt) from the remaining neutral syn ester.

According to one embodiment of the present invention, therefore, we provide a precess for separating the syn and anti components in an ester derivative of an α-(etherified oximino) carboxylic acid existing as a mixture of the syn and anti isomers which comprises partially hydrolysing said mixture under basic conditions, separating the preferentially formed anti acid from the residual syn ester and subsequently, if desired, hydrolysing the syn ester under basic conditions and isolating the resulting syn acid.

The acid from which the isomeric ester mixture is derived may be represented by the formula

$$R^u.C{:}NOR^b.COOH \tag{II}$$

where $R^u$ is as hereinbefore defined and $R^b$ is an etherifying monovalent organic group linked to the oxygen atom through a carbon atom.

The groups $R^u$ and $R^b$ in the formula preferably contain not more than 16 carbon atoms and may, for example, be aliphatic, e.g. alkyl, alkenyl or alkynyl, preferably containing not more than 8 carbon atoms; cycloaliphatic e.g. cycloalkyl, preferably containing 3–7 carbon atoms, or cycloalkenyl or cycloalkadienyl, preferably containing 4–7 carbon atoms; non-aromatic heterocyclic, e.g. a 5- or 6-membered ring containing at least one heteroatom selected from oxygen, nitrogen and sulphur, such as piperidinyl; araliphatic, e.g. carbocyclic or heterocyclic aryl lower (e.g. $C_{1-4}$) alkyl; or aromatic, i.e. carbocyclic or heterocyclic aryl.

The process of the invention is of particular value in preparing the syn and anti isomers of acids of formula $$R^1.C:NOR^2.COOH \quad \text{(III)}$$

where $R^1$ is a carbocyclic aromatic or heterocyclic aromatic group and $R^2$ is an alkyl, cycloalkyl, aralkyl, carbocyclic aromatic or heterocyclic aromatic group.

The selective hydrolysis may be effected by treating a solution of the isomeric mixture of esters with a base, preferably using at least one equivalent of base relative to the total amount of ester present. The base used will to some extent depend on solubility considerations in the reaction medium employed but in general may be, for example, an alkali metal or alkaline earth metal hydroxide such as sodium, potassium or calcium hydroxide, an alkali metal carbonate such as sodium or potassium carbonate, an alkali metal hydrogen carbonate such as sodium hydrogen carbonate, ammonium hydroxide or a tetralkylammonium hydroxide such as tetra-n-butylammonium hydroxide. One may also use suitable buffer systems based on, for example, sodium phosphate or sodium acetate, at a pH of, for example 7.5. The hydrolysis may be effected a temperatures in the range −20° to +80°C, for example 0°–30°C, and is advantageously carried out at room temperature.

A variety of solvent systems may be employed for the selective hydrolysis, these normally comprising water and a co-solvent inert to the reaction conditions employed and serving to dissolve the ester derivative. Suitable solvents thus include homogeneous systems such as aqueous alcohols e.g. aqueous methanol or aqueous ethanol, aqueous cyclic ethers e.g. aqueous dioxan or aqueous tetrahydrofuran, and aqueous ketones e.g. aqueous acetone. Two phase systems, e.g. water and an aliphatic ether such as diethyl ether, may also be used.

The course of the selective hydrolysis may be monitored by, for example, titration of aliquots of the reaction solution to determine the amount of acid liberated, or by thin layer chromatography. The hydrolysis may be quenched by acidification, and the liberated anti acid separated by conventional techniques such as extraction with base, e.g. aqueous sodium bicarbonate. The remaining neutral syn ester fraction may then be hydrolysed, e.g. by addition of further base, under more vigorous conditions and/or over a longer period of time to liberate the syn acid, which may then be extracted and worked up by conventional methods.

The point at which the hydrolysis is quenched to permit extraction of the anti acid may be varied to ensure optimum purity of whichever isomer is desired. Thus where the anti isomer is the primary desired product it may be preferred to stop the hydrolysis slightly early to minimise the liberation of contaminating syn acid. Similarly where the syn acid is the primary desired product the initial partial hydrolysis may be prolonged slightly to ensure maximum saponification of the anti ester and hence maximum removal of the secondary anti isomer.

In general, however, the separated isomers obtained by the process of the invention may each contain a small proportion of the other isomer. The major isomer content of each fraction will, however, normally be sufficiently high to enable the minor isomer contaminant to be removed by a single purification step.

The α-(etherified oximino) carboxylic acid may be prepared as described in the copending applications referred to above, for example by reaction of a glyoxylic acid of general formula $$R^u.CO.COOH \quad \text{(IV)}$$

(where $R^u$ is as hereinbefore defined) or an ester thereof with a compound $R^bONH_2$ (where $R^b$ is as hereinbefore defined).

Where a free acid of formula IV is used the resulting acid of formula II may be converted to an ester derivative by any convenient method. It will be appreciated that in this esterification the composition of the mixture of isomers may be changed due to equilibration; in some cases this may be advantageous. In other cases, however, it may be desired to esterify the mixture of isomers by a method that does not change the relative proportions of syn and anti isomers present. One such method, in which an acid chloride formed by reacting a salt, e.g. the sodium salt, of an acid of formula II with a halogenating agent such as oxalyl chloride is reacted with an alcohol such as methanol in the presence of an acid binding agent such as pyridine, is described in the co-pending applications referred to above. Other convenient esterification processes include reaction of the acid with a diazoalkane such as diazomethane or diazoethane or with a dialkyl sulphate such as dimethyl sulphate.

The glyoxylic acid of formula IV or an ester thereof may be reacted with hydroxylamine to give the corresponding α-hydroxyiminoacetic acid derivative; this compound or a salt thereof may subsequently be O-etherified to form a compound of formula II or an ester thereof. Suitable etherifying reagents for this purpose include organic halides, sulphates and sulphonates, e.g. a compound $R^3X$ where $R^3$ is an alkyl or aralkyl group and X is halogen, sulphate, or sulphonate, e.g. tosylate; alkylfluorosulphonates e.g. methyl fluorosulphonate; diazoalkanes e.g. diazomethane; trialkyloxonium tetrafluoroborates e.g. triethyloxonium tetrafluoroborate; and diaryliodonium halides, e.g. compounds of formula $Ar_2I^+X^-$ where Ar is aryl, e.g. phenyl, and X is chlorine or bromine. Reagents such as diazo compounds, fluorosulphonates and tetrafluoroborates may require assistance, e.g. with a Lewis acid such as $BF_3$. Where a free acid of formula II is employed the etherification and esterification may be effected in a single stage to give an ester of formula $$\begin{array}{c} R^u . C . COOR^b \\ \| \\ N \\ \mathbin{\rotatebox[origin=c]{-45}{$\int$}} \\ OR^b \end{array} \quad \text{(V)}$$

(where $R^u$ and $R^b$ are as hereinbefore defined) which may be employed directly in the process of the invention.

In general a wide range of ester derivatives of acids of formula II may be used in the process of the invention. The esterifying group may thus be derived from, for example, an aliphatic or araliphatic alcohol or a phenol, such compounds containing up to 20 carbon atoms, e.g. an alkanol such as methanol, ethanol, n-propanol, isopropanol or n-butanol or an aralkanol such as benzyl alcohol. Esterifying groups derived from lower alkanols, e.g. containing 1–6 carbon atoms, such as methanol or ethanol, which may be readily introduced by reaction with esterifying agents as described above, are preferred on grounds of practical convenience. Where $R^a$ is an alkyl group, i.e. where the acid (II) is an α-(etherified oximino) alkanoic acid, it may be desirable to use a more labile esterifying group e.g. p-nitrophenyl, pentachlorophenyl or 2,2,2-trichloroethyl.

As indicated above, the group $R^1$ in formula III may be a carbocyclic aromatic or heterocyclic aromatic group. Suitable carbocyclic aromatic groups include phenyl and naphthyl and such groups substituted by halo e.g. chloro or bromo, hydroxy, lower alkyl e.g. methyl, nitro, amino, lower alkylamino e.g. methylamino, diloweralkylamino e.g. dimethylamino, lower alkanoyl e.g. acetyl, lower alkanoylamido, lower alkoxy e.g. methoxy or ethoxy, or lower alkylthio e.g. methylthio. Suitable heterocyclic aromatic groups include 5- and 6-membered heterocyclic groups containing at least one hetero atom selected from S, N and O e.g. thien-2-yl, thien-3-yl, furyl such as fur-2-yl, pyridyl such as pyrid-3-yl, pyrrolyl, N-substituted pyrrolyl e.g. N-methylpyrrolyl, isothiazolyl, thiadiazolyl, oxadiazolyl, 3- or 4-isoxazolyl, substituted 3- or 4-isoxazolyl e.g. 3-aryl-5-methylisoxazol-4-yl, the aryl group being e.g. phenyl or halophenyl, or sydnone; and fused heterocyclic groups containing at least one hetero atom selected from S, N and O, e.g. benzothienyl such as benzothien-2-yl or benzothien-3-yl, benzofuryl or indolyl.

Where $R^2$ in the formula III is an alkyl group this advantageously contains 1–16, preferably 1–8 carbon atoms, and thus may be, for example, a methyl, ethyl, n-propyl, isopropyl, n-butyl, isobutyl, sec-butyl, t-butyl, octyl or dodecyl group. Cycloalkyl groups $R^2$ preferably contain 3–7 carbon atoms, e.g. cyclopentyl or cyclohexyl. Suitable aralkyl groups $R^2$ include carbocyclic or heterocyclic aryl lower alkyl groups in which the lower alkyl portion contains 1–4 carbon atoms, for example benzyl, phenethyl, diphenylmethyl, triphenylmethyl, thienylmethyl such as thien-2-ylmethyl, furylmethyl such as furfuryl, pyridylmethyl and pyrrolylmethyl groups. Suitable carbocyclic aromatic and heterocyclic aromatic groups $R^2$ include those listed above for the group $R^1$.

In general $R^2$ may be unsubstituted or may carry one or more substituents such as, for example, hydroxy: alkoxy, e.g. methoxy, ethoxy, n-propoxy or isopropoxy; aryloxy, e.g. phenoxy; aralkoxy, e.g. benzyloxy; mercapto; alkylthio, e.g. methylthio or ethylthio; arylthio; aralkylthio; amino; substituted amino, e.g. methylamino, ethylamino or dimethylamino; halo, e.g. chloro or bromo; nitro; azido; carboxy; formyl; acyl, e.g. acetyl, propionyl or benzoyl; cyano, phthalimido; acylamido, e.g. acetamido or benzamido; alkoxycarbonylamino, e.g. methoxycarbonylamino or ethoxycarbonylamino; or aralkoxycarbonylamino, e.g. benzyloxycarbonylamino.

Where only one isomer of a given compound is required, the process can be rendered more economical by equilibrating the unwanted isomer to create a mixture of syn and anti isomers which may then be separated in accordance with the invention to give a further supply of the desired isomer. Equilibration is conveniently effected by acid treatment of the unwanted isomer, the extent of equilibration depending on the position of euqilibrium for a particular reaction system. Thus an unwanted anti acid fraction may be treated with an acidic halogenating agent, e.g. thionyl chloride or a phosphorus halide such as the trichloride, tribromide or pentachloride. preferably in excess, to yield an equilibrated mixture of syn and anti isomers of the acid halide, which may then be reacted with an appropriate alcohol to yield an isomeric ester mixture which may serve as input for the separation proocess. Similarly an unwanted syn ester fraction may be treated with, for example, a mineral acid such as hydrochloric acid, preferably in the presence of an inert organic solvent such as ethyl acetate or dioxan, to give an equilibrated isomeric mixture of esters suitable for further selective hydrolysis.

α-(Etherified oximino) carboxylic acid is isomers separated by the process of the invention may, if desired, subsequently be converted to the corresponding α-hydroxyimino carboxylic acid by removal of the etherifying group and thence, if desired, to an α-acyloxyimino carboxylic acid. Where it is intended to effect such subsequent transformation it is preferred to separate isomers containing an easily removable ether group, e.g. an aralkyl group such as p-methoxybenzyl, trityl, fur-2-ylmethyl or thien-2-ylmethyl which may be removed by treatment with, for example, trifluoroacetic acid.

The invention thus provides a convenient, economical and widely applicable technique for obtaining separated syn and anti isomers of α-hydroxyimino carboxylic acid derivatives.

The following Examples illustrate the invention All temperatures are in °C

EXAMPLE 1 syn-Thien-2-ylmethoxyiminothien-2-ylacetic acid

Thien-2-ylmethoxyamine hydrochloride (7.37 g.) and thien-2ylglyoxylic acid (6.24 g.) were dissolved in ethanol (110 ml.) and water (20 ml.). The pH of the solution was adjusted to 5.0, and this solution was stirred for 22 hr. The ethanol was evaporated off, and the aqueous mixture was neutralised, washed twice with ether, then acidified to pH 1.5. The acid mixture was extracted with ethyl acetate. The combined extracts were washed, dried and evaporated to dryness to give a yellow oil (9.2 g., 86%) which crystallised on standing. TLC indicated the solid to be a mixture of isomers. Recrystallisation of this solid several times from cyclohexane effected no separation of isomers. The mixture of acids (5.0 g.) was esterified with diazomethane in diethyl ether to give the mixture of methyl esters, as a pale-yellow oil.

To a solution of the mixture of methyl esters (2.14 g.) in methanol (50 ml.) was added 2N sodium hydroxide solution (7.6 ml.). After stirring this solution for 0.5 hr., the solution was neutralised. The methanol was evaporated and the aqueous residue was extracted with ethyl acetate. The extracts were washed, dried, and evaporated to dryness to give a yellow oil (1.0 g.). This oil was dissolved in methanol (25 ml.) and stirred for 18 hr. with 2N sodium hydroxide solution (5 ml.). Methanol was removed by evaporation and the aqueous residue, after washing with ethyl acetate then acidification to pH 1.7, was extracted with ethyl acetate. The extracts were washed, dried, and evaporated to dryness to give a solid (730 mg.). Recrystallisation of this solid twice from cyclohexane gave syn-thien-2-ylmethoxyimino-(thien-2-yl)acetic acid (369 mg.), m.p. 101°–102°, $\lambda_{max.}$ )EtOH) 239, 289.5 nm ($\epsilon$ 11,700, 12,300), $\tau$ (DMSO-$d_6$) values include 4.67 (s, $CH_2$).

EXAMPLE 2 syn-2-Benzyloxyiminobenzo[b]-thien-3-ylacetic acid

Benzo[b]-thien-3-ylglyoxylic acid (2.27 g) and benzyloxyamine hydrochloride (1.915 g) were dissolved in ehtanol (70 ml) and water (30 ml). The solution was adjusted to pH 4.5 with 40% w/v sodium hydroxide solution and stirred at this pH for 2 hr. The solution was stood overnight and adjusted to pH 9 then washed with ether. The aqueous phase was acidified under ethyl acetate and the organic layer was washed with water, saturated brine and dried. Evaporation gave a mixture of syn and anti-isomers as a buff crystalline solid 93.4 g., 99%). The crude acid in ether was treated with excess diazomethane in ether at 0°–5°. The excess reagent was destroyed with acetic acid and the ether solution was washed with sodium bicarbonate, water and dried. Evaporation gave a pale brown oil (3.34 g., 93%). The crude product in methanol (100 ml.) was treated with sodium hydroxide solution (1N, 10 ml) at room temperature for 1 hr. The hydrolysis was followed by thin layer chromatography on silica. Hydrochloric acid (2N 5 ml.) was added to stop the hydrolysis and methanol was removed by evaporation. Ethyl acetate was added and the anti-2-benzyloxyimino benzo[b]-thien-3'-ylacetic acid was removed by washing with sodium bicarbonate. The ethyl acetate layer was washed with water and dried and evaporated to a pale orange oil (1.99 g., 56%). This was treated in methanol (90 ml.) with sodium hydroxide (1N; 10 ml) at room temperature for 7 hr. A further aliquot of sodium hydroxide (1N; 5 ml) was added and the solution stood for 2 days to complete hydrolysis. The methanol was removed by evaporation and the residue dissolved in ethyl acetate and water. The mixture was adjusted to pH 1.5 and the ethyl acetate layer was washed with water, saturated brine and dried. Evaporation gave yellow cyrstals (1.82 g, 50%) Crystallisation from a mixture of benzene and cyclohexane gave the title compound as pale orange crystals (1.29 g., 36%), m.p. 120.5 °–121°, $\lambda_{max}$. (EtOH) 232, 285.5, 296.5 306.5 nm. ($\epsilon$22,500, 11,800, 11,500, 10,400), $\tau$ values (DMSO-d$_6$) include 1.90, 1.97, 2.3–2.7 (aromatic protons), 4.64 (CH$_2$ singlet).

EXAMPLE 3 syn-2-Benzyloxyiminobenzo-[b]-thien-2-ylacetic acid

Benzo[b]-thien-2-ylgyoxylic acid (3.092 g) and benzyloxyamine hydrochloride 92.72 g.) in ethanol (170 ml.) and water (70 ml.) were adjusted to pH 4.5 with sodium hydroxide (40%). The solution was stirred at this pH at room temperature for 6 hr. Benzyloxyamine hydrochloride (500 mg.,) was added and the solution stood at room temperature overnight. The solution was adjusted to pH 8 and washed with ether. The aqueous phase was acidified under ether to pH 1.5. The ether layer was washed with water and dried. Evaporation gave a cream coloured solid (4.28 g, 91%) as an isomeric mixture.

The crude isomeric mixture was treated in ether with excess diazomethane in ether at 0°–5°. The excess reagent was destroyed with acetic acid and the ether solution was washed with sodium bicarbonate, water and dried. Evaporation gave an oil (4.45 g., 91%). This was dissolved in methanol (140 ml.) and treated at room temperature with sodium hydroxide solution (1N; 14 ml.) for 2¼ hr. Hydrochloric acid (2N, 7 ml.) was added and the alcohol was removed by evaporation. The aqueous phase was partitioned between sodium bicarbonate solution and ether. The ether layer was washed with water and dried, evaporation gave an oil (2.16 g., 44%). This was hydrolysed directly in refluxing methanol (70 ml.) with sodium hydroxide (1N; 7 ml) for 4 hr. The methanol was removed by evaporation and the residue partitioned between water and a little ether. The aqueous layer was acidified under ether to pH 1.5 and the ether layer was washed with water, dried and evaporated to give a pale cream solid (1.97 g, 42%). Crystallisation from a mixture of benzene and cyclohexane gave the title compound as a white crystalline solid, (1.61 g; 35%), m.p. 141°–143+ (dec.),$\lambda_{max}$. (EtOH) 230.5, 253, 297.5 nm ($\epsilon$ 16,400; 7,400; 24,100), $\tau$ (DMSO-d$_6$) values include 2.00, 2.36, 2.55 (aromatic protons), 4.71 (CH$_2$ singlet).

EXAMPLE 4 t-Butoxyimino benzo[b]thien-2-ylacetic acid syn and anti-isomers

Benzo[b]thien-2-ylglyoxylic acid (3.09 g.) and t-butoxyamine hydrochloride (1.983 g.) were dissolved in 50% aqueous ethanol 9100 ml.). The solution was adjusted to pH 4.5 with sodium hydroxide solution and maintained at this pH for 4 hours at room temperature. t-Butoxyamine hydrochloride (500 mg.) was added and the solution kept at room temperature overnight. The alcohol was removed by evaporation and the aqueous phase adjusted to pH 8 and washed with ether. The aqueous phase was then acidified to pH 1.5 under ether. The ether solution was washed with water and dried. Evaporation gave a cream solid (4.05 g. 97%). Fractional crystallisation from cyclohexane gave anti-t-butoxyiminobenzo[b]thien-2-yl acetic acid (1.6 g., 38.5%) m.p. 123–4° (123.3°).

$\lambda_{max}$. (EtOH) 225 inf., 253, 307 ($\epsilon$ 17,300, 10,200, 20,000). The mother liquors were combined and evaporated to give a cream solid (2.11 g.) that was esterified with diazomethane in ether to give a mixture of the methyl esters of the title compounds as an oil 91.75 g.). The oil dissolved in methanol 970 ml.) was treated with sodium hydroxide solution (N: 7 ml.) and kept at room temperature for 3 hours. Thin layer chromatography (CHCl$_3$: CH$_3$OH: CH$_3$CO$_2$H, 18:2:1) showed hydrolysis of the anti-isomer with little hydrolysis of the syn-isomer. Hydrochloric acid (2N: 3.5 ml.) was added and the methanol was removed by evaporation. Conventional separation of neutral material gave the crude ester (syn isomer) as an oil (0.92 g.). The crude oil dissolved in methanol (20 ml.) was treated with sodium hydroxide (N: 7 ml.) and refluxed for 3 hours. Sodium hydroxide solution (N: 5 ml.) was added and the mixture refluxed for a further 6 hours. The methanol was removed by evaporation and the aqueous residue was extracted with ether. The aqueous phase was acidified (pH 1.5) under ether and the ether layer washed with water, dried and evaporated to give the crude acid (syn-isomer) (760 mg. 18%). Crystallisation from benzene containing cyclohexane gave syn-t-butoxyiminobenzo[b]thien-2-ylacetic acid (430 mg.), m.p. 108–9°, $\lambda_{max}$. (EtOH) 231, 253, 297 nm ($\epsilon$17,000, 7,240, 24,500), $\tau$ (DMSO-d6) values include 2.02, 2.41, 2.57 (aromatic protons), 8.65 (C(CH$_3$)$_3$).

EXAMPLE 5 syn-Methoxyiminophenylacetic acid

Methoxamine hydrochloride (4.18 g.) was added to a solution of methyl phenylglyoxylate (8.2 g.) in methanol (100 ml.). Sodium hydroxide solution (2N) was added until the pH was ca. 4.5 and fresh additions were made to maintain this pH for 42 hours. (ca. 25 ml. in all) and more ethanol (50 ml.) was added after 1½ hours to obtain a nearly clear solution. At the end of this time the reaction mixture was diluted with water and the methanol evaporated under reduced pressure. The neutral material was collected in ether conventionally. Evaporation gave a mixture of syn and anti methyl methoxyiminophenylacetates as a yellow oil (8.73 g., 90%) (largely the syn isomer). The mixture of esters (4.59 g.), was dissolved in methanol (120 ml.) and sodium hydroxide solution (24 ml.), was added. After 5 minutes thin layer chromatography (petrol:ether 2:1) indicated completion of the hydrolysis of the anti-ester and after 13 minutes the reaction mixture was treated with hydrochloric acid (2N: 24 ml.). Water was added and the methanol removed under reduced pressure. Conventional work-up gave acidic material (1.25 g.) and neutral material (2.86 g.). The neutral fraction in methanol (75 ml.) was treated with sodium hydroxide solution (2N: 16 ml.) and kept for 16 hours. Conventional isolation of acidic material gave the crude syn-acid (2.30 g.) m.p. 94°–96.6°. Crystallisation from a mixture of cyclohexane and benzene (ca. 35 ml: 5 ml.), charcoaling gave syn-methoxyiminophenylacetic acid (1.43 g., 34%) m.p. 97.2°–99.2°.

EXAMPLE 6 syn-Isopropoxyiminophenylacetic acid

A mixture of phenylglyoxylic acid (3.0 g.), isopropoxyamine hydrochloride (2.5 g.), ethanol (100 ml) and water (50 ml) was stirred and adjusted to pH 4.5 to 5 with sodium hydroxide solution (2N). The solution was stirred for 5 hr. maintaining the pH at 4.5–5 with further additions of sodium hydroxide solution. The ethanol was removed by evaporation, the aqueous residue acidified and the product collected by extraction with ethyl acetate. Evaporation of the ethyl acetate gave a brown oil (4.2 g.) that was esterified conventionally with diazomethane to give a mixture of the syn and anti methyl esters of the title compound as an oil (4.04 g.).

The mixture of esters (4.0 g) in methanol (60 ml) was treated with sodium hydroxide solution (2N:19.0 ml) and kept for 2 hr. at room temperature. The methanol was evaporated and the residue, diluted with water, extracted with ethyl acetate. Evaporation of the dried (MgSO$_4$) ethyl acetate solution gave the crude syn methyl ester (0.82 g.). The ester (0.82 g) in methanol (20 ml) was treated with sodium hydroxide solution (2N:3.6 ml) and kept at room temperature for 31 hr. Conventional isolation of acidic material gave the crude syn isomer (0.706 g) which was recrystallised from cyclohexane to give the title compound (0.358 g.), m.p. 59.5°, $\lambda_{max.}$ (EtOH) 258 nm ($\epsilon$12,700), $\tau$ (DMSO-d$_6$) values include 2.47 (phenyl), 5.53 (O—C$\underline{H}$<), 8.71 (CH$_3$).

EXAMPLE 7 syn-Propoxyiminothien-2-ylacetic acid

A mixture of thien-2-ylglyoxylic acid (3.12 g), n-propoxyamine hydrochloride (2.8 g.), ethanol (75 ml) and water (75 ml) was adjusted to pH 4.5 to 5 with sodium hydroxide solution (2N) and stirred at room temperature. A clear solution at pH 4.5 to 5 was maintained by further additions of base and ethanol as required. After 4 hr. a further portion of n-propoxyamine hydrochloride (1.4 g) was added and the mixture stirred for a further 3 hr. (keeping the pH at 4.5–5) and then kept overnight. The ethanol was evaporated and the residual solution diluted with water, acidified and extracted with ethyl acetate. Evaporation of the dried ethyl acetate solution gave a mixture of the syn and anti forms of the title acid as an oil (4.8 g.).

The mixture of acids was esterified conventionally with diazomethane to give a mixture of the syn and anti methyl ester (3.175 g.).

The mixture of esters in methanol (50 ml.) was treated with sodium hydroxide solution (2N; 14 ml) for 10 min. at room temperature. The methanol was removed, rapidly, by evaporation and the residue, in water, extracted with ethyl acetate. Evaporation of the dried ethyl acetate solution gave the syn methyl ester (0.416 g). The ester in methanol (10 ml) was treated with sodium hydroxide solution (2N: 1.7 ml) and kept at room temperature for 26 hr. Conventional isolation of acid material gave the title compound as an oil (0.235 g.) $\tau$ (DMSO-d$_6$) values include 2.28, 2.7–2.9 (thienyl), 5.90 (O—C$\underline{H}_2$).

EXAMPLE 8

2-Benzyloxyiminophenylacetic Acid (anti-isomer)

Oxalyl chloride (3.75 ml.) was added to a magnetically stirred suspension of syn-2-benzyloxyiminophenylacetic acid (10.2 g.) in dry benzene (100 ml.). Dimethylformamide (2 drops) was added and the mixture stirred for 2½ hr., the solid dissolved in about one-half hr. The reaction mixture was evaporated and the residue dissolved in dry benzene (100 ml.). A mixture of dry methanol (20 ml.) and dry pyridine (8.0 ml.) was added and the mixture stirred for 1½ hr. The solvents were evaporated and a solution of the residue in ether was washed with dilute hydrochloric acid, water, dilute sodium bicarbonate solution and water. Evaporation of the dried ether solution gave a mixture of syn- and anti-methyl 2-benzyloxyiminophenylacetates (10.9 g., 100%) in the ratio of 45:55.

A solution of the mixture of methyl esters (2.7 g) in methanol (ca. 80 ml.) was treated with tetrabutylammonium hydroxide (6.5 ml; 40%) and then made up to 100 ml. with methanol. At intervals 3 ml. aliquots of the reaction mixture were removed and titrated against 0.1N hydrochloric acid. After 4 hr. the hydrolysis was about 45% complete and 1:0 N hydrochloric acid (4.7 ml; the calculated amount to neutralise the remaining 85% of the reaction mixture) was added. Water was added and the reaction mixture evaporated under reduced pressure to remove methanol. The mixture was extracted with ethyl acetate and the organic extract washed thoroughly with dilute hydrochloric acid and then worked up conventionally for acidic and neutral products. The liquid, neutral ester fraction, (1.15 g; 50%), was estimated to contain about 80% syn and 20% anti isomers by N.M.R. The acidic fraction was a solid (0.91 g; 42%) m.p. 93.0° which was crystallised from cyclohexane containing a little benzene to give pure anti-2-benzyloxyiminophenylacetic acid m.p. 96.0° [a mixture with authentic syn acid (m.p. 103°)

melted at 77.8°], $\lambda_{max}$ (EtOH) 250.5 nm ($\epsilon$9,100), $\tau$ (DMSO-d$_6$) values include 2.44 (m, Ph), 2.62 (s, CH$_2$Ph), 4.73 (s, CH$_2$).

EXAMPLE 9

2-(Thien-2-ylmethoxyimino)-(1-methylpyrrol-2-yl)acetic acid (syn-isomer)

A solution of 1-methylpyrrol-2-ylglyoxylic acid (4.6 g) and thien-2-ylmethoxamine hydrochloride (5.46 g) in aqueous ethanol (100 ml, 1:1) was adjusted to pH 4.8 with 10N-sodium hydroxide solution and stirred at pH 4.8 for 24 hours at room temperature. A further portion of thien-2-ylmethoxamine (0.5 g) was added and the solution was maintained at pH 4.8 and room temperature for a further 2 days. The pH was then adjusted to 8 with sodium bicarbonate solution and the ethanol was removed by evaporation. The aqueous residue was washed with ether and the aqueous phase was acidified to pH 1.5 under ether with 2N-hydrochloric acid. The ether extracts were combined and washed with water, dried and evaporated to give an orange oil (8.8 g). The crude mixture of syn and anti-isomer was esterified with a slight excess of diazomethane in ether.

To a solution of the mixed methyl esters (7.7 g) in methanol (100 ml) was added N-sodium hydroxide (28 ml). The mixture was kept at room temperature for 3 hours when thin-layer chromatography of an aliquot showed only traces of remaining anti-ester. After a further 30 minutes 2N-hydrochloric acid (14 ml) was added and the methanol was removed by evaporation. The residue was partitioned between ether and excess sodium bicarbonate in water. The ether layer was separated, washed with water, dried and evaporated to a pale orange oil (5.9 g).

This oil in methanol (100 ml) was treated with 10N-sodium hydroxide solution (4.5 ml) and kept at room temperature for 16 hours. A further portion of 10N-sodium hydroxide solution (4.5 ml) was added and after 24 hours at room temperature the mixture was warmed to 60° for 30 minutes. The methanol was removed by evaporation and the residue divided between ether and sodium bicarbonate solution. The aqueous phase was acidified under ether with 2N-hydrochloric acid. The combined ether extracts were washed with water and dried. Evaporation of the ether gave a pale orange oil (4.8 g) which was crystallised from carbon tetrachloride to give the title compound as pale brown crystals (1.9 g); m.p. 70°–71°; $\lambda_{max}$ (EtOH) 235, 287.5 nm ($\epsilon$11,600 and 17,100); $\tau$ (DMSO-d$_6$) values include 4.70 (S, CH$_2$) and 6.18 (S, CH$_3$).

We claim:

1. A process for separating the syn and anti components of an ester of an $\alpha$-(etherified oximino) carboxylic acid of the formula $R^1.C:NOR^2.COOH$ where $R^1$ is phenyl or naphthyl or such a group substituted by halo, hydroxy, lower alkyl, nitro, amino, lower alkylamino, diloweralkylamino, lower alkanoyl, loweralkanoylamido, lower alkoxy or lower alkylthio; thienyl; furyl; pyridyl; pyrrolyl; N-methylpyrrolyl; isothiazolyl; thiadiazolyl; oxadiazolyl; isoxazolyl; 3-phenyl-5-methylisoxazol-4-yl; 3--halophenyl-5methylisoxazol-4-yl; sydnone; benzothienyl; benzofuryl or indolyl and $R^2$ is $C_1$–$C_{16}$ alkyl; $C_3$–$C_7$ cycloalkyl; aryl $C_1$–$C_4$ alkyl wherein aryl is phenyl, thienyl, furyl, pyridyl or pyrrolyl; phenyl; naphthyl; thienyl; furyl; pyridyl; pyrrolyl; N-methylpyrrolyl; isothiazolyl; thiadiazolyl; oxadiazolyl; isoxazolyl; sydnone; benzothienyl; benzofuryl or indolyl or any of these groups substituted by at least one of hydroxy, methoxy, ethoxy, n-propoxy, iso-propoxy, phenoxy, benzyloxy, mercapto, methylthio, ethylthio, amino, methylamino, ethylamino, dimethylamino, halo, nitro, azido, carboxy, formyl, acetyl, propionyl, benzoyl, cyano, phthalimido, acetamido, benzamido, methoxycarbonylamido, ethoxycarbonylamido or benzyloxycarbonylamino, said ester existing as a mixture of the syn and anti isomers which includes hydrolysing said mixture under basic conditions to hydrolyse the anti ester but interrupting the hydrolysis before the syn ester is hydrolysed and separating the preferentially formed anti acid from the residual syn ester.

2. A process as defined in claim 1, wherein at least one equivalent of base relative to the total amount of ester present is employed in the hydrolysis.

3. A process as defined in claim 1, wherein the base employed in the hydrolysis is selected from the group consisting of alkali metal hydroxides, alkaline earth metal hydroxides, alkali metal carbonates, alkali metal hydrogen carbonates, ammonium hydroxide and tetralkylammonium hydroxides.

4. A process as defined in claim 1, wherein the hydrolysis is effected at a temperature in the range −20° to +80°C.

5. A process as defined in claim 1 wherein the hydrolysis is effected in a solvent system comprising water and an inert co-solvent selected from the group consisting of alcohols, aliphatic ethers, cyclic ethers and ketones.

6. A process as defined in claim 1, wherein only one isomer of the $\alpha$-(etherified oximino) carboxylic acid is required, and the unwanted isomer is equilibrated by acid treatment of the unwanted isomer to give a further mixture of syn and anti isomers, which mixture is subsequently subjected to further partial hydrolysis as defined in claim 1.

7. A process as defined in claim 6 wherein the unwanted isomer comprises the anti acid, and the said isomer is contacted with an acidic halogenating agent to yield an equilibrated mixture of the syn and anti isomers of the corresponding acid halide, and this mixture is reacted with an alcohol to yield an isomeric ester mixture.

8. A process as defined in claim 1, wherein the residual syn ester is thereafter hydrolysed under basic conditions and the resulting syn acid is isolated.

* * * * *